Figures 1, 2:
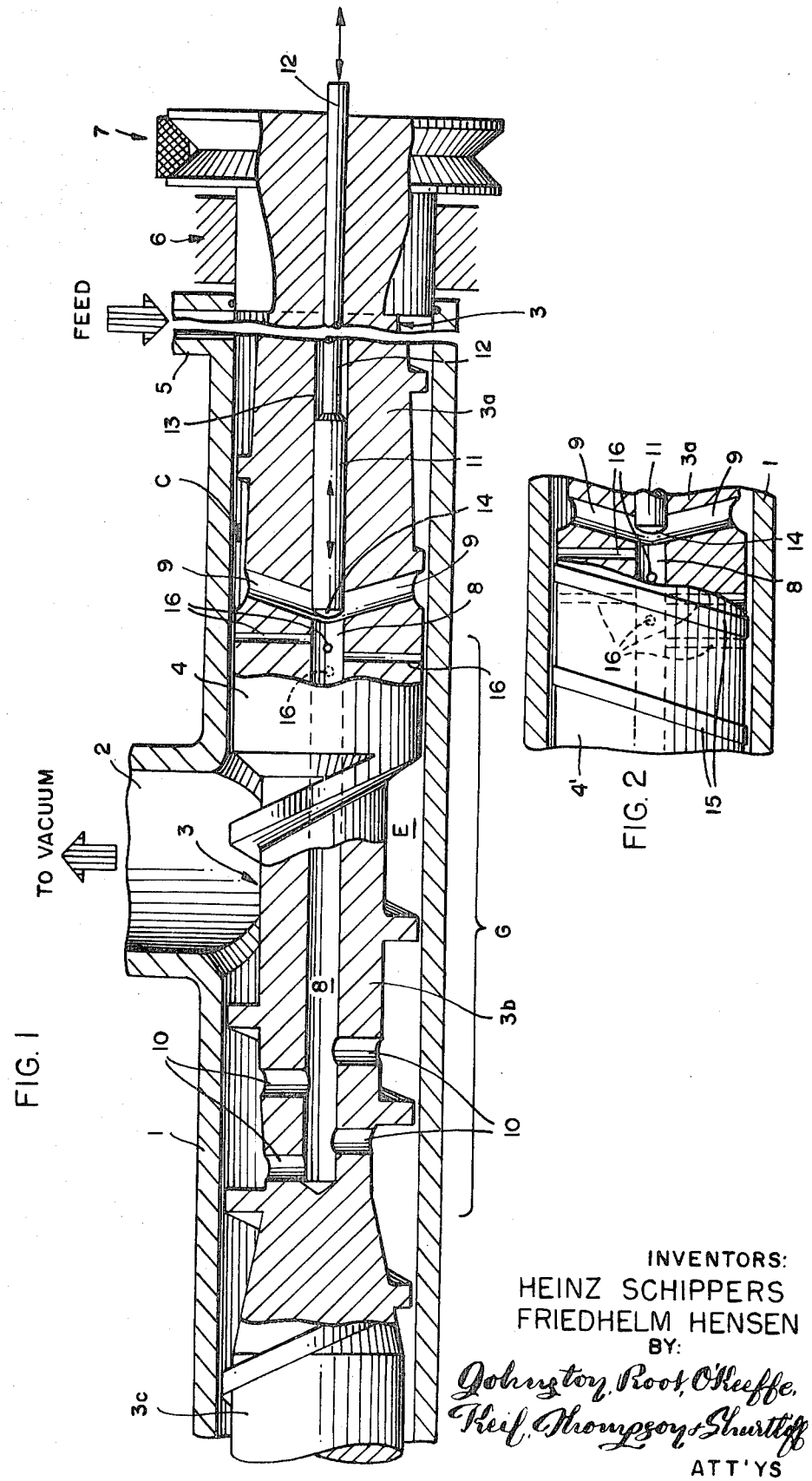

United States Patent [19]
Schippers et al.

[11] 3,712,594
[45] Jan. 23, 1973

[54] VENTED SCREW EXTRUDER WITH PRESSURE AND FLOW REGULATING MEANS

[75] Inventors: Heinz Schippers; Friedheim Hensen, both of Remscheid, Germany

[73] Assignee: Barmag Barmer Maschinenfabrik Aktiengesellschaft, Nuppertal, Germany

[22] Filed: June 28, 1971

[21] Appl. No.: 157,194

[30] Foreign Application Priority Data

June 27, 1970 Germany................P 20 31 935.1

[52] U.S. Cl..................................259/191, 425/208
[51] Int. Cl. ................................................B01f 7/08
[58] Field of Search........259/8, 9, 10, 25, 26, 45, 46, 259/191, 192, 193, DIG. 8, DIG. 10, DIG. 11, DIG. 13; 425/207, 208, 209

[56] References Cited

UNITED STATES PATENTS

| | | |
|---|---|---|
| 3,371,379 | 3/1968 | Reifenhauser........................259/191 |
| 3,021,561 | 2/1962 | Reifenhauser........................425/208 |
| 1,935,050 | 11/1933 | Gordon...............................259/191 |
| 3,572,646 | 3/1971 | Heinzkocher.........................259/25 |
| 3,503,944 | 3/1970 | Wisseroth et al......................425/208 |

Primary Examiner—Robert W. Jenkins
Assistant Examiner—Stuart S. Levy
Attorney—Johnston, Root, O'Keeffe, Keil, Thompson & Shurtleff

[57] ABSTRACT

A vented two-stage screw extruder for processing thermoplastic polymers wherein an axially positioned valve means, especially a slide valve in a central bypass, is provided for regulating the pressure and flow of a polymer melt from the compression side to the expansion side of the two-stage extruder.

10 Claims, 2 Drawing Figures

INVENTORS:
HEINZ SCHIPPERS
FRIEDHELM HENSEN

VENTED SCREW EXTRUDER WITH PRESSURE AND FLOW REGULATING MEANS

Two-stage, single-threaded screw extruders are commonly employed for melting, mixing, conveying or otherwise processing thermoplastic polymers, particularly where one requires a continuous and uniform processing and extrusion of the thermoplastic melt. Thus, in referring to a two-stage extruder, it will be recognized that the initial stage comprises a feed zone followed by a so-called transition zone and then a metering zone where the polymer melt is conveyed at a relatively high pressure. The first stage thus acts to place the polymer melt under compression after which the melt flows directly into the second stage where it is rapidly subjected to expansion, for example by a much deeper thread depth, so that moisture or other volatile gases will escape from the melt and pass out of the extruder through a vent or other outlet into the atmosphere or under the influence of a vacuum. The expansion zone or at least that portion which is vented is essentially only partly filled with the polymer melt, especially to permit as complete a degassing of the melt as possible and also to avoid any unintentional extrusion of the polymer melt out of the vent. At the same time, however, the second stage of the two-stage screw extruder must act as a pumping zone or second metering zone in order to again bring the melt up to a pressure at which it can be extruded through a die or other extrusion means at the discharge end of the extruder.

This general construction and arrangement of a two-stage screw extruder for degassing or devolatilizing a polymer melt has been considered in great detail in the prior art, including such standard references as "Plastics Extrusion Technology", by Allan L. Griff, Van Nostrand Reinhold Co., 2nd Edition (1968), Chapter 1, pages 14–15 and especially the references cited on pages 31 and 32. Attention is also directed to pages 163–164 of the book "Processing of Thermoplastic Materials" by E. C. Bernhardt, Reinhold Publishing Corp., New York (1959), this reference including certain preferred variations. The generally known construction and operation of these two-stage, single-screw extruders are not a part of the present invention and do not require a detailed description with reference to the overall features of such extruders. Also, it should be noted that venting of the screw extruders has previously been carried out through a port or stack-like opening in the wall of the barrel housing of the screw or else by means of a hollow core or root of the screw itself. For purposes of the present invention, the extraction of gases or vapors occurs only through a port or opening in the barrel housing or cylindrical casing of the screw.

In these vented screw extruders with the known arrangement of single-threaded screws arranged coaxially one behind the other to form two stages and connected rigidly together, an attempt has been made to achieve reasonable product quality and the highest possible performance besides the regulation of the material in the extruder die and also a regulation of the feed of the polymer melt into the expansion zone. For example, it has been suggested that a throttle element of a regulating valve be provided at the end of the first discharge or metering zone. This is located in a channel or conduit issuing from the side of the screw housing as a bypass channel for the melt between the screw stages, through which the blocking thread or flight of the screw shutting off the first discharge zone is bypassed.

Such known embodiments with the bypass channel for the melt provided outside of the screw housing are disadvantageous in the sense that a regulating valve in the side channel permits only a very coarse regulation of pressure or melt throughput. Furthermore, this side channel must be additionally heated. The construction of such side channels is also quite difficult and costly from a manufacturing and technical viewpoint, especially on account of the additional requirement for attaching the side channel onto bores directed outwardly through the screw housing.

Another arrangement of this type is known in a vented, two-stage, single-threaded screw wherein the melt bypass channel is arranged by sections as an axial bore in the core of the screw between the two screw stages. In this instance also, the screw segment between the first and second stages forms a blocking thread or flight terminating the first discharge or metering zone. However, no regulating valve is provided in the melt bypass channel. This known construction with a bypass channel arranged axially by sections exhibits in addition to the main disadvantage that it is not capable of being regulated, the further disadvantage that the screw must be connected together from at least two separate elements of the screw on account of the axial channel being provided only by sections. In other words, there is no satisfactory technical means of manufacture which permits a one-piece construction of the screw for insertion into a housing. Moreover, this makes a cleaning of the axial channel very difficult as well as the assembly or disassembly of the entire device. Finally, it is impossible to provide any subsequent insertion of a regulating valve or any operation of such a valve during continuous operation of the extruder.

It is further known that vented screw extruders of this type can be provided with a blocking collar or retention ring having a variable throttle gap, such an element being used in place of the above-noted blocking or damming thread of the screw. Such collars or enlarged ring-like portions of the screw are generally used in connection with means for producing an axial reciprocal movement of the screw. This approach is disadvantageous in the sense that constituents of the melt can flow into the gas or vapor outlet opening by means of the provided throttle gap, whereby this opening becomes stopped up under certain circumstances. Disadvantages also arise with reference to the shifting or sliding movement of the screw, especially because a reciprocating movement of the entire mass of the screw requires an additional and separate drive means. Also, a trouble-free operation of such a reciprocating screw is relatively difficult to achieve.

Although the vapors or gases as volatile constituents of the melt can be released directly to the atmosphere through a suitable outlet opening in the screw housing, it is usually helpful to provide means for evacuating the expansion zone of the screw by connecting a vacuum device onto the outlet opening. Likewise, the initial feed into the screw can also be placed under a vacuum in order to initially remove a certain amount of air or moisture, such variations having little effect upon the flow and pressure actually placed upon the thermoplastic polymer melt in the compression, metering or pumping zones of the two-stage screw. These variations in the venting of gases as well as the use of other known valving or throttling devices can be employed but do not take the place of the specific combination or arrangement of the present invention.

One object of the present invention is to provide a vented screw extruder, preferably of the two-stage, single-threaded type, whereby one can retain all of the advantages of a regulated pressure and melt flow in the compression and expansion zones of the extruder without requiring any side channels or bypasses leading outside of the screw housing. At the same time, it is an object of the invention to provide a specific arrangement of a regulating valve for a melt bypass channel together with control means for the build up of pressure in the second stage metering or pumping zone of the melt. In essence, it is an object of the invention to provide a common pressure and flow regulating means centrally and axially at a point intermediate the two stages of the screw and entirely within the confines of the barrel housing.

Yet another object of the invention is to provide a vented screw extruder with such improved pressure and flow regulating means whereby the entire structure can be readily assembled and/or disassembled in its initial construction or for purposes of cleaning. Still another object of the invention is to provide a vented screw extruder which can be readily adapted for use with different thermoplastic polymer melts and which can be controlled during operation of the screw.

These and other objects and advantages of the invention will become more apparent upon consideration of the following detailed specification.

It has now been found, in accordance with the present invention, that a substantial improvement can be achieved in a two-stage vented screw extruder for processing a thermoplastic polymer, wherein the extruder includes an intermediate screw section forming a first stage compression zone and a second stage expansion zone for the polymer melt, by providing in combination therewith a throttling means or melt flow restriction means along the screw section between the first and second stages for building up pressure in the compression zone, a screw core containing an axially located bypass channel in fluid connection with the compression and expansion zones by means of approximately radially extending inlet and outlet bores, and also valve means axially adjustable in the bypass channel for regulation of the melt flow therethrough. The valve means preferably includes an axially slidable regulating element which extends out of one end of the extruder and which can be manually or automatically operated during the extrusion operation. At the same time, the throttling means is preferably a radially enlarged collar or annular ring member extending over a short axial segment of the screw core between the compression and expansion zones, the outer peripheral surface or mantle being smooth or threaded with a shallow thread depth to provide a restricting or damming effect upon the melt flow in the annular space between this collar and the inner wall of the barrel housing. In an especially advantageous embodiment of the invention, this collar contains a plurality of radially positioned bores at selected axial intervals so as to provide an additional melt path between the outer peripheral surface of the collar and the bypass channel extending axially therethrough, the valve means being adjustable to open and close the individual bore openings into the bypass channel.

Particular embodiments of the invention are illustrated in the accompanying drawing in which:

FIG. 1 is a longitudinal section taken on the axis of rotation of the screw extruder, various segments being omitted and certain elements being indicated only schematically; and FIG. 2 is a similar longitudinal section of one segment of the screw extruder, illustrating a modified form of the flow restricting collar member shown in FIG. 1.

The illustrated two-stage, single-threaded screw extruder is generally constructed in a conventional manner to provide a barrel or cylindrical housing 1 provided with a lateral outlet opening or port 2 for venting gases or vapors from an intermediate section of the extruder screw 3, particularly in the degassing zone G of the two-stage screw. This degassing zone or portion of the extruder essentially requires a throttling means as may be provided by the transition from the relatively shallow thread depth formed by the screw core 3a in the first stage of the extruder and the much deeper thread depth formed by the screw core 3b in the second stage of the extruder. For purposes of the present invention, however, it is especially desirable to employ a radially enlarged collar or annular sleeve ring 4 as a throttling means to separate the compression zone C of the first stage from the expansion zone E of the second stage. This collar 4 as a throttling or flow restricting means permits a maximum pressure to be built up in the melt at the end of the annular compression zone C at the end of the first stage of the screw 3a which is usually a metering section with a constant screw core diameter or may also have a gradually increased core diameter as illustrated. At least a portion of the melt tends to flow in the very restricted annular passage between the outer peripheral surface of the collar 4 and the oppositely opposed inner wall surface of the barrel housing 1. The pressure imparted to the melt by this collar 4 is then released in the expansion zone E where the diameter of the screw core is greatly reduced. The sudden release of pressure has a flashing effect so that gases or volatile vapors are released from the melt, which normally only partly fills the expansion zone E, and these gases or vapors are withdrawn through the port 2, preferably to a vacuum as indicated. Following the expansion zone E, the polymer melt is conveyed through the second stage of the extruder in a pumping or second metering section as indicated by the re-enlarged core 3c of the screw. There can be a sharp transition from the small core diameter of the screw section 3b in the expansion zone out to the large core diameter of the screw 3c in the pumping section, or else this transition can occur more gradually over the length of the extruder, it being understood that the polymer melt eventually fills the screw channel and is placed under sufficient pressure for extrusion at the discharge end of the barrel housing.

Thus, aside from the illustrated intermediate section of the screw corresponding to the transition between the first stage and the second stage of a barrel vented extruder, the remaining construction is essentially conventional and includes an initial feed hopper or port 5 as well as bearing means 6 and drive means 7 for the continuous rotation of the screw 3. The thermoplastic polymer is of course normally introduced as a feed into the extruder in the form of a solid granular material and is then transformed into a polymer melt as it is conveyed through the first stage. It will be recognized that the present invention is essentially concerned with the compression and expansion of this thermoplastic polymer melt for the purpose of venting or degassing any accompanying gases, vapors or other volatile materials.

In order to control the pressure and the flow rate of the polymer melt, an axial bypass channel 8 must be provided in the screw core or root between the compression and expansion zones C and E so as to provide a melt path in the form of an alternative melt stream flowing through rather than around the collar 4. Thus, from the end of the compression zone C of the first screw stage 3a, the melt can be permitted to flow through the inclined but generally radial inlet bores 9 into the axial channel 8 and then axially along the screw 3 into one or more screw channels of the expansion zone E where the melt can again flow outwardly through the radial outlet bores 10. Since there is again a drop in pressure from the zone C into the larger annular space of the screw channels in the expansion zone E, then a degassing or ventilating of the melt also occurs with respect to the melt flowing through the bypass channel 8. To the extent that the screw channels in the expansion zone E are not filled with the melt, gases or vapors can flow backwardly over the thread flights into the port or vent 2. Depending upon generally known principles in the construction and operation of a two-stage extruder, the vent 2 can be placed toward the end of the expansion zone and/or the radial outlet bores 10 can be shifted closer to the beginning of the expansion zone, in opposition to the illustrated arrangement.

The screw core also contains an adjustable valve head 11 in the nature of a slide valve which is connected to an adjusting rod 12 which extends axially backwardly through a bore 13 which is in part an extension of the bypass channel 8 in the screw core 3a. At the feed end of the extruder, this adjusting rod 12 projects outside of the extruder and can be reciprocated axially as indicated by the double-headed arrow, using any suitable manual or automatic adjusting mechanism for placing the valve head 11 in a predetermined position with reference to the bypass channel 8 and its radial bores. This arrangement of the valve and all of its adjusting elements on the drive side of the screw extruder represents an especially favorable arrangement of the valve means for purposes of the present invention.

The valve head 11 can be provided with a tip 14 formed into a shape which is most favorable for the flow stream of the melt in the region of the entrance to the bypass channel 8. A rounded tip, such as that illustrated, is especially desirable so that it can be retracted substantially flush with the walls of the inlet bores 9 when the valve is fully withdrawn or in the substantially open position of these bores. By using this valve to change the effective cross-section of the bypass channel, i.e., at the point where the bores 9 join this channel 8, a fine regulation of the valve head 11 permits careful control of both the throughput of melt per unit time and also the pressure build-up in the subsequent pumping or metering zone along the screw section 3b, this pressure in the second stage of the screw being regulated by the rate of supply of melt to the second stage. The length of the valve head 11 depends upon the number and placement as well as the size of the inlet bores 9 and also the placement and size of other radial bores which may be supplied downstream of the channel 8 as discussed more fully below.

The annular gap between the throttling or blocking collar 4 and the inner wall of the housing 1 must be at least about 0.2 mm. in order to provide at least a minimum flow of the melt through this gap space even if the valve 11 were to completely close off the inlet bores 9. In screw extruders of conventional commercial sizes, this annular gap between the collar 4 and housing 1 preferably is within a range of about 0.2 to 1.0 mm.

In a modified embodiment of the collar 4' as shown in FIG. 2 of the drawing, this throttling or blocking segment of the screw can also be formed as a threaded collar, preferably with a counter thread which runs oppositely to the normal conveying threads of the extruder screw. This counter thread 15 is indicated in FIG. 2 as extending partly or entirely over the length of the collar 4', only a shallow thread depth being required to continuously convey a small amount of melt backwardly into the first stage, such an arrangement permitting a high back pressure to be produced in the compression zone C.

In still another special embodiment of the invention, the collar 4 or 4' is provided with a plurality of essentially radially positioned bores 16 of smaller cross-section than the inlet bores 9. These radial bores 16 extend between the peripheral surface of the collar or throttling means 4 or 4' and the axial bypass channel 8. Where the collar 4' has a counter thread 15 as shown in FIG. 2, bores 16 are preferably spaced axially from one another so as to emerge just before or after the thread flight 15 as indicated. In other words, these bores 16 should emerge in the collar thread channel and not on the land surface of the flight thread 15.

In cooperation with the adjustable valve 11, these additional radial bores 16 permit a variation or control of the height of pressure in the compression zone C at the end of the first screw stage. Depending upon the position of the valve 11, one can achieve different damming or throttling lengths in the relatively constricted or narrow flow paths around or through the collar 4.

Various flow patterns and characteristics can thus be achieved through use of the bypass channel 8 in combination with the axial feed inlet bores 9 or the pressure regulating bores 16, all of these bores or channels being opened and closed by the adjustable slide valve 11. Although variations in design and construction of such bores are possible, it has been found desirable to employ inlet bores 9 with a diameter of about 5 to 8 mm. while the additional radial bores 16 have a smaller diameter of about 3 to 6 mm. These measurements are taken with reference to a preferred axial bypass channel 8 having a diameter of from about 12 to 20 mm.

The two-stage screw extruder, when constructed in accordance with the invention, permits one to obtain a comparatively narrow and compact retention or throttling gap between the screw and the housing over a short interval between the first and second stages. Furthermore, by reason of the axially arranged and adjustable valve means in the axial bypass channel for the melt, the throughput of the melt flowing from the compression zone C into the expansion zone E can be finely regulated to achieve optimum results with reference both to degassing and pressure regulation in both stages. The degassing effect is enhanced by the fact that a number of exit openings or bores 10 of proportionally large cross-section can be connected at the exit end of the bypass channel 8. At the same time, the pressure build-up of the melt in the second-stage pumping zone following the expansion zone is readily influenced and controlled by the slide valve 11, and the same general construction together with the additional radial bores 16 permits a further influence and control on the pressure created in the compression zone C.

The invention is not limited to an arrangement of the screw extruder in an horizontal position as indicated in the drawing, and in fact, especially favorable results have been achieved when the extruder is placed in a substantially vertical position with reference to its axis of screw rotation. In this instance, the adjusting or regulating elements such as 12 of the slide valve 11 can be arranged in the screw portion 3c so as to lead out of the other end of the extruder. In such vertical arrangements, the conveyance of the melt in a vertical direction has a more favorable effect on degassing, and also the arrangement of the regulating valve as it is shifted vertically on the screw axis is also more advantageous. When using a vertically arranged screw extruder, it is also possible to provide the drive means at the bottom or lower end of the screw while the thermoplastic polymer is initially fed into the top end of the extruder. In this instance, the valve means and its regulating elements also preferably extend upwardly from the bottom end or drive end of the extruder in an axial bore extending through the second stage of the screw and into the bypass channel. In addition to such variations in a vertical arrangement of the screw extruder, other changes or modifications within the scope of the invention will be apparent to those skilled in this art.

The screw extruder including the intermediate section embodying the special features of the present invention can be constructed from conventional metals such as steel and steel alloys, the shaping and assembly of parts being relatively simple and inexpensive. Also, conventional means can be used for supplying the initial thermoplastic polymer feed as well as discharging or extruding the processed polymer melt.

Thus, in using a radially enlarged collar as a blocking or throttling means on the screw, the barrel housing inner wall is advantageously formed as a smooth and completely cylindrical bore from its inlet end to the discharge or extrusion end, requiring only a simple lateral port or opening for venting gases or vapors without any need for additional bores or conduits in the barrel housing wall. This further permits a simplified and conventional heating of the extruder, i.e., by employing the usual resistance or induction heating means in or around the barrel housing. It is a particular advantage that additional heating of a bypass channel or conduit is not necessary. Moreover, an axial adjustment of the entire screw within the housing is avoided, and no pressure or flow rate needs to be adjusted in this manner.

The screw itself, as used in the present invention, can also be made as a single piece, i.e., as a unitary and integral one-piece threaded screw having the required intermediate throttling means between the two stages in the form of a radially enlarged collar or sleeve. Of course, it is also feasible to prepare this collar or sleeve separately and either permanently or removably fasten it onto the screw core. In the latter instance, any conventional means can be employed to hold the collar or sleeve in place until removed for cleaning or replacement. Such an interchangeable collar or sleeve permits an even greater adaptation of the same extruder to polymer melts of widely different compositions and physical properties, especially different viscosities under processing conditions.

The invention further permits the provision of a hollow screw, i.e., one with a concentric cylindrical hollow axial bore which not only presents an axial channel for the melt together with a number of radial bores but also receives the valve means and its axial adjusting element. This arrangement of the axial channel and radial bores also permits a very simple cleaning or flushing of the bypass channel as well as other bores or fluid conduits for the polymer melt. The arrangement of the axial bore of the screw further permits the insertion of valve control or adjusting means in a manner such that direct control and supervision of the melt pressures and flow throughput amounts can be accomplished during the continuous processing and extrusion of the thermoplastic polymer by the vented screw extruder.

It will be further apparent that one can easily regulate the flow and pressure of the melt in both stages of the screw by relatively fine axial reciprocal movement of the valve head along the bypass channel. Moreover, this arrangement is readily adapted to be used with automatic controls which are responsive to easily measured processing conditions at various points along the length of the screw. Once optimum conditions have been established for a particular polymer, one can then automatically regulate or control the extrusion process so as to achieve excellent quality and uniformity of the extruded product.

The invention is hereby claimed as follows:

1. In a two-stage, vented screw extruder for processing a thermoplastic polymer having an intermediate screw section forming a first stage compression zone and a second stage expansion zone for the polymer melt, the improvement comprising:

throttling means along said screw section between said first and second stages for building up pressure in said compression zone;

a screw core containing an axially located bypass channel in fluid connection with said compression and expansion zones by means of approximately radially extending inlet and outlet bores; and valve means axially adjustable in said bypass channel to regulate melt flow therethrough.

2. A screw extruder as claimed in claim 1 wherein said valve means includes an axially slidable regulating element extending out one end of the extruder.

3. A screw extruder as claimed in claim 2 wherein a slide valve is sealingly fitted for reciprocal movement in a cylindrical conduit extending concentrically along the screw core axis of rotation such that a portion of the cylindrical conduit acts as said axial bypass channel.

4. A screw extruder as claimed in claim 1 wherein said throttling means is a radially enlarged collar extending over a short axial segment of the screw core between said compression and expansion zones.

5. A screw extruder as claimed in claim 4 wherein said collar has a smooth peripheral surface spaced at least 0.2 mm. from the inner wall surface of the extruder housing.

6. A screw extruder as claimed in claim 4 wherein said collar has a thread flight on its peripheral surface as means to restrict the flow of the melt.

7. A screw extruder as claimed in claim 6 wherein said collar is counter-threaded with reference to the conveying threads of the extruder screw.

8. A screw extruder as claimed in claim 4 wherein said collar contains a plurality of radially positioned bores at selected axial intervals to provide a melt path between the outer peripheral surface of said collar and said bypass channel extending therethrough, said valve means being adjustable to open and close the individual bore openings into the bypass channel.

9. A screw extruder as claimed in claim 1 wherein at least one inlet bore to said bypass channel is positioned at about the annular opening into said throttling means and a plurality of additional essentially radially positioned bores are contained in said throttling means at selected axial intervals between an outer restricted annular throttled volume and the inner axially located bypass channel, said valve means being adjustable to open and close the individual bore openings into the bypass channel, thereby regulating both the melt pressure in said compression zone and the rate of flow of melt into said expansion zone.

10. A screw extruder as claimed in claim 1 arranged with its axis of screw rotation in a substantially vertical position.

* * * * *